(No Model.)
S. C. VAN BUREN & S. C. SHOUP.
CORN HARVESTER.
No. 409,079. Patented Aug. 13, 1889.
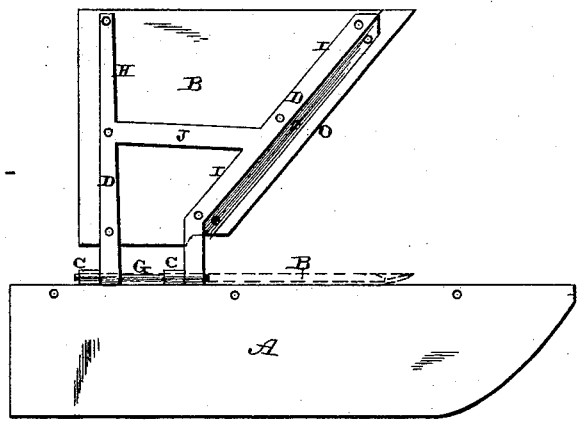
Fig. 1.
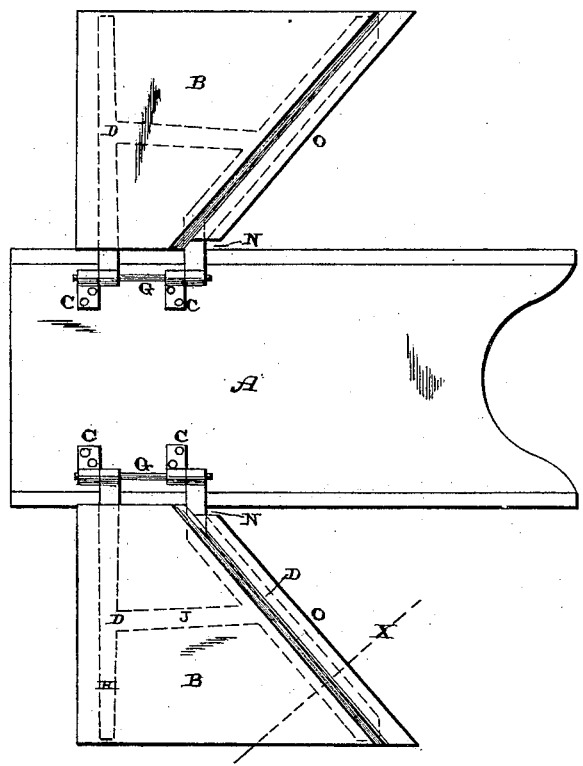
Fig. 2.
Fig. 3.
Witnesses:
E. P. Ellis,
L. L. Burket
Inventors.
S. C. Van Buren,
S. C. Shoup,
per J. A. Lehmann, atty.

UNITED STATES PATENT OFFICE.

SAXTON C. VAN BUREN AND SAXTON C. SHOUP, OF CAREY, OHIO.

CORN-HARVESTER.

SPECIFICATION forming part of Letters Patent No. 409,079, dated August 13, 1889.

Application filed October 8, 1888. Serial No. 287,503. (No model.)

*To all whom it may concern:*

Be it known that we, SAXTON C. VAN BUREN and SAXTON C. SHOUP, of Carey, in the county of Wyandot and State of Ohio, have invented certain new and useful Improvements in Corn-Harvesters; and we do hereby declare the following to be a full, clear, and exact description of the invention, such as will enable others skilled in the art to which it pertains to make and use it, reference being had to the accompanying drawings, which form part of this specification.

Our invention relates to an improvement in corn-harvesters; and it consists in the combination of the vehicle having hinged wings attached to opposite sides and the knives at the forward edges of the wings, there being spaces or openings left between the inner ends of the knives and the outer edges of the vehicle, as will be more fully described hereinafter.

Figure 1 represents a side elevation of a harvester embodying our invention, the wings being shown in a raised position. Fig. 2 is a plan view of the same with wings horizontal. Fig. 3 is a horizontal section of one of the wings and connected parts, taken on the dotted line $x\,x$.

A represents a sled or vehicle of any desired construction, which is just wide enough to be drawn through between the rows of corn, and to which the two wings B are hinged. A portion C of the hinge of each wing is secured rigidly to the top of the sled or vehicle at a suitable distance from its edge, and the other portion of the hinge is formed by the metallic frame D, which is united to the part C by means of the pintle G. These metallic frames D have the wings B secured upon their tops, and the frames D are so shaped as to support the wings at those points where they need it most while in operation.

As shown in Fig. 1, each of the frames is made of a piece of metal, which consists of a prong H, which extends along under the rear edge of the wing, and a prong I, which extends along under the front edge, and a connecting-strip J, which unites the two prongs H I together. The front prongs I are made sufficiently wide to project beyond the front edges of the wings B, and are slightly rounded or bent upward at their front edges, so as to form supports for the knives O and incline the cutting-edges of the knives slightly upward. By attaching the knives O to the metallic prongs I instead of to the wings themselves a much finer and more solid support is furnished for the knives, and the knives can be given any inclination upward that may be desired.

The inner ends of the prongs H I rest solidly upon the top of the vehicle A, and thus rigidly support the wings in a horizontal position and give the wings sufficient strength to support operators upon them.

The knives O have their cutting-edges set at any desired angle to the vehicle A, and are made to extend from the outer edges of the wings to within a short distance of the outer edges of the vehicle, leaving spaces or openings N, into which the weeds and grass which are not sufficiently rigid to be cut by the knives will be forced by the inclined edges and the forward movement of the vehicle, and from which openings they will slip out as the machine is drawn forward. If the knives extended up to or beyond the edges of the vehicle, the grass and weeds would catch in the corners formed by the knives and the edges of the vehicle, and thus clog the forward motion of the machine.

Having thus described our invention, we claim—

1. In a corn-harvester, the combination of the vehicle, the metallic frames hinged to opposite sides thereof and consisting of the prongs H I, and connecting-strip J with the knives O and the wings B, the front edges of the prongs I being made to project beyond the front edges of the wings B and turned upward at a suitable angle to receive the knives O, substantially as shown.

2. In a corn-harvester, the combination of the vehicle, the wings B, and the metallic frames hinged to opposite sides of the vehicle and forming supports for the wings, and the knives O, the front edges of the metallic frames being made to project beyond the front edge of the wings B and adapted to have the knives O secured thereto, substantially as described.

3. In a corn-harvester, the combination of the vehicle, the wings hinged to its sides, and the knives at the forward edges of the wings, there being spaces or openings left between the inner ends of the knives and the outer edges of the vehicle, substantially as set forth.

In testimony whereof we affix our signatures in presence of two witnesses.

SAXTON C. VAN BUREN.
SAXTON C. SHOUP.

Witnesses:
JAS. H. CAROTHERS,
T. W. MCCLURE.